US012617911B2

(12) United States Patent
Ahn et al.

(10) Patent No.: US 12,617,911 B2
(45) Date of Patent: May 5, 2026

(54) ARTIFICIAL LEATHER FOR CRASH PADS AND CRASH PADS MANUFACTURED USING THE SAME

(71) Applicants:Hyundai Motor Company, Seoul (KR); Kia Corporation, Seoul (KR); LX HAUSYS, Ltd., Seoul (KR); TAS FL, Gyeongsangbuk-do (KR); Yong San Co., Ltd., Ulsan (KR)

(72) Inventors: Jin Gi Ahn, Seoul (KR); Jung Gyun Noh, Gyeonggi-do (KR); Kyeong Hoon Jang, Seoul (KR); Dae Sik Kim, Gyeonggi-do (KR); Sung Moo Lee, Ulsan (KR); Dong Seog Noh, Daegu (KR); Yong Bae Jung, Seoul (KR); Chang Hoon Lee, Seoul (KR); Kyung Hak Kang, Seoul (KR); De Eun Park, Seoul (KR)

(73) Assignees: Hyundai Motor Company, Seoul (KR); Kia Corporation, Seoul (KR); LX HAUSYS, Ltd., Seoul (KR); TAS FL, Gyeongsangbuk-do (KR); Yong San Co., Ltd., Ulsan (KR)

( * ) Notice: Subject to any disclaimer, the term of this patent is extended or adjusted under 35 U.S.C. 154(b) by 265 days.

(21) Appl. No.: 17/962,985

(22) Filed: Oct. 10, 2022

(65) Prior Publication Data

US 2023/0174732 A1 Jun. 8, 2023

(30) Foreign Application Priority Data

Dec. 3, 2021 (KR) ........................ 10-2021-0171459

(51) Int. Cl.
*C08J 7/04* (2020.01)
*C08J 5/04* (2006.01)
(Continued)

(52) U.S. Cl.
CPC ............... *C08J 7/042* (2013.01); *C08J 5/046* (2013.01); *D06N 3/0036* (2013.01); *D06N 3/14* (2013.01); *D06N 2211/28* (2013.01)

(58) Field of Classification Search
CPC ......... C08J 7/042; C08J 5/046; D06N 3/0036; D06N 3/14; D06N 2211/28; D06N 3/0009;
(Continued)

(56) References Cited

U.S. PATENT DOCUMENTS

2022/0024401 A1* 1/2022 Kim ........................ B32B 27/12

FOREIGN PATENT DOCUMENTS

KR 20090109235 A * 10/2009
KR 101197522 B1 * 11/2012
(Continued)

OTHER PUBLICATIONS

Machine Translation of WO2020067850A1 (Year: 2020).*
Machine Translation of KR20090109235A (Year: 2009).*
Machine Translation of KR101197522B1 (Year: 2012).*

*Primary Examiner* — Jenna N Chandhok
(74) *Attorney, Agent, or Firm* — Fox Rothschild LLP

(57) ABSTRACT

Disclosed are an artificial leather for crash pads and a crash pad manufactured using the same. The artificial leather for crash pads may have improved workability when workers directly cover a crash pad with the artificial leather for crash pads and require reduced manufacturing costs by using a textile substrate layer made of a circular knit fabric that satisfies a specific physical property range.

14 Claims, 1 Drawing Sheet

(51) Int. Cl.
     *D06N 3/00*           (2006.01)
     *D06N 3/14*           (2006.01)
(58) Field of Classification Search
     CPC .. D06N 3/0056; D06N 3/30075; D06N 3/183;
                    D06N 2211/262; B60R 21/045
     See application file for complete search history.

(56)              References Cited

FOREIGN PATENT DOCUMENTS

| KR | 102002262 | B1 | 7/2019 | |
| KR | 102202652 | B1 | 1/2021 | |
| WO | WO-2020067850 | A1 * | 4/2020 | ........... D06N 3/0006 |

* cited by examiner

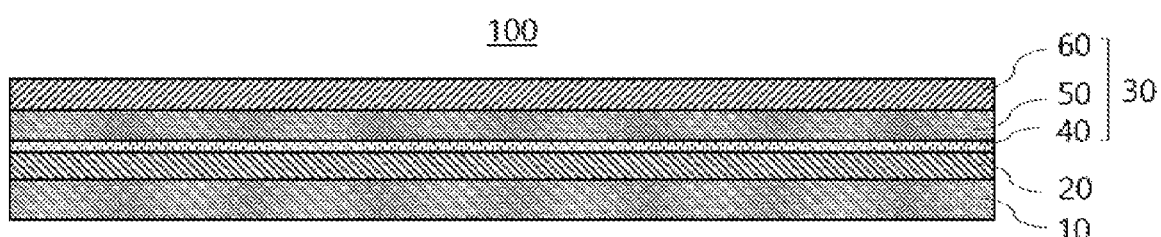

ARTIFICIAL LEATHER FOR CRASH PADS AND CRASH PADS MANUFACTURED USING THE SAME

CROSS-REFERENCE TO RELATED APPLICATION

This application claims under 35 U.S.C. § 119(a) the benefit of priority to Korean Patent Application No. 10-2021-0171459, filed on Dec. 3, 2021, the entire contents of which are incorporated herein by reference.

TECHNICAL FIELD

The present invention relates to an artificial leather for crash pads, a crash pad including the artificial leather, and a vehicle including the crash pad. The artificial leather for crash pads may have improved workability when workers directly cover a crash pad with the artificial leather for crash pads and require reduced manufacturing costs using a textile substrate layer made of a circular knit fabric that satisfies a specific physical property range.

BACKGROUND

A vehicle interior component called a "crash pad" is installed underneath the windshield, and is manufactured so as to attach thereto an instrument panel that is integrated with various instruments such as a speedometer and a fuel gauge, as well as audio and navigation systems and the like. For example, the crash pad includes a textile substrate layer made of polyurethane that absorbs shocks and exhibits a buffering property for safety, and a skin layer that exhibits various patterns thereon. A typical crash pad includes a product that includes a textile substrate layer, the surface of which is treated by spraying.

However, the method has a limitation of difficulty achieving various surface patterns, and also has disadvantages such as difficulty in realizing a luxurious interior vehicle atmosphere, such as a highly classy texture.

In recent years, a crash pad covered with natural leather has been developed in order to achieve a highly sophisticated texture and a luxurious interior atmosphere in a vehicle. Natural leather can create a much more luxurious interior atmosphere, but varies greatly depending on the age or area of the cow due to the nature of natural leather materials generally manufactured from cowhide, and are prone to wrinkling, shrinkage, and deformation depending on the management method. In addition, natural leather is entirely dependent on imports and is very expensive, thus being limited to high-end cars and having a limitation on expansion of application thereof to a greater variety of vehicle models. Accordingly, there is increasing need to develop artificial leather that exhibits various functionalities and excellent physical properties while exhibiting a feel, texture, and appearance comparable to natural leather, and a crash pad using the same.

A generally used method of manufacturing artificial leather for automobile interior materials includes applying a water-dispersible urethane resin or an organic solvent-type urethane solution containing an organic solvent such as dimethylformamide or methyl ethyl ketone onto release paper, drying the resulting paper to form a film of a surface layer, applying an adhesive agent onto the surface layer, crosslinking and curing the result, and laminating the result with a textile substrate such as a short fiber-type microfiber nonwoven fabric or woven fabric.

However, this method has a problem in that a lot of wrinkles are generated when applied as a covering material for crash pads because only the surface coating layer of water-dispersible urethane is formed on the textile substrate, such as a short-fiber nonwoven fabric or woven fabric having a relatively low density.

The above information disclosed in this Background section is only for enhancement of understanding of the background of the invention, and therefore it may contain information that does not form the prior art that is already known in this country to a person of ordinary skill in the art.

SUMMARY

In preferred aspect, provided is an artificial leather for crash pads that makes it easy for workers to cover a crash pad with the artificial leather for automobile crash pads and reduces manufacturing costs by forming a textile substrate layer with a circular knit fabric that is impregnated with a polyurethane composite resin and satisfies a specific physical property range.

Further, in preferred aspects, provided is an artificial leather for crash pads that is capable of improving the emotional quality without damaging the appearance, and satisfying airbag deployment test criteria by forming a textile substrate layer with a circular knit fabric impregnated and coated with a polyurethane composite resin and satisfying a specific physical property range.

In another preferred aspect, provided is a crash pad including the artificial leather for crash pads.

The objects of the present invention are not limited to those described above. Other objects of the present invention will be clearly understood from the following description, and are able to be implemented by means defined in the claims and combinations thereof.

In one aspect, provided is an artificial leather for crash pads including a textile substrate layer, a wet foaming layer disposed on the textile substrate layer, and an upper layer disposed on the wet foaming layer. Particularly, the textile substrate layer may include a circular knit fabric impregnated with a polyurethane composite resin.

A "circular knit fabric" as used herein refers to a fabric having a cross section in a circle or round shape, which may have regular or irregular diameter along a longitudinal direction of the fabric.

The circular knit fabric may have an elongation in a longitudinal direction (L) of about 30 to 150% and an elongation in a width direction (W) of about 50 to 250% at a temperature of about 20 to 30° C.

The circular knit may have a tensile strength in the longitudinal direction (L) of about 20 to 70 kgf/cm and a tensile strength in the width direction (W) of about 20 to 50 kgf/cm at a temperature of about 20 to 30° C.

Yarns constituting the circular knit fabric may have a thickness of about 100 to 150 denier. The yarns constituting the circular knit fabric may suitably include one or more selected from the group consisting of natural fibers, synthetic fibers, and regenerated fibers.

The polyurethane composite resin may include a polyurethane resin. The polyurethane resin may suitably include any one selected from the group consisting of polycarbonate-based polyurethane resins, polyester-based polyurethane resins, and polyether-based polyurethane resins.

The polyurethane composite resin may further include an additive. The polyurethane composite resin may suitably include the additive in an amount of about 30 to 150 parts by weight, based on 100 parts by weight of the polyurethane resin.

The additive may include one or more selected from the group consisting of calcium carbonate, flame retardants, surfactants, and toners.

The artificial leather may further include a napped layer on at least one surface of the textile substrate layer.

Fibers constituting the napped layer may have a thickness of about 0.6 to 0.8 mm.

The artificial leather may further include a non-napped layer on at least one surface of the textile substrate layer.

The non-napped layer may include a polyurethane resin and ester fibers. Particularly, the non-napped layer may include a polyurethane resin impregnated with ester fibers.

The upper layer may include a binder layer, a skin layer disposed on the binder layer, and a surface treatment layer disposed on the skin layer.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

The FIGURE shows an exemplary artificial leather for crash pads according to an exemplary embodiment of the present invention.

DETAILED DESCRIPTION

The objects described above, as well as other objects, features and advantages, will be clearly understood from the following preferred embodiments with reference to the attached drawings. However, the present invention is not limited to the embodiments, and may be embodied in different forms. The embodiments are suggested only to offer a thorough and complete understanding of the disclosed context and to sufficiently inform those skilled in the art of the technical concept of the present invention.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to include the plural meaning as well, unless the context clearly indicates otherwise.

It will be further understood that the terms "comprises" and/or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The artificial leather for crash pad may include a textile substrate layer, a wet foaming layer disposed on the textile substrate layer, and an upper layer disposed on the wet foaming layer. In particular, the textile substrate layer may include a circular knit fabric and a polyurethane composite resin. Preferably, the circular knit fabric may be impregnated with the polyurethane composite resin.

Hereinafter, the configuration of the present invention will be described in more detail with reference to the drawings.

The FIGURE shows an exemplary artificial leather for crash pads according to an exemplary embodiment of the present invention. The artificial leather 100 for crash pads includes a textile substrate layer 10, a wet foaming layer 20 disposed on the textile substrate layer 10, and an upper layer 30 disposed on the wet foaming layer 20.

1. Textile Substrate Layer 10

The textile substrate layer 10 may be made of a circular knit fabric impregnated with a polyurethane composite resin. In addition, the circular knit fabric may be surface-coated with a polyurethane composite resin. The impregnation and coating with the polyurethane composite resin may provide the shape-retaining property to withstand repeated expansion and shrinkage and stiffness suitable for the covering process. In particular, in order to achieve the circular knit fabric suitable for the covering process, the circular knit fabric may be impregnated with an impregnation solution containing a polyurethane composite resin or a copolymer thereof, to coat the impregnated circular knit fabric with a coating solution, to coagulate the resulting circular knit fabric in a coagulation bath, and to wash the fabric with water to remove the organic solvent (e.g., DMF) therefrom.

The circular knit may have an elongation in a longitudinal direction (L) of about 30 to 150% and an elongation in a width direction (W) of about 50 to 250% in a temperature range of about 20 to 30° C., and may have an elongation in a longitudinal direction (L) of about 40 to 150% and an elongation in a width direction (W) of about 60 to 250% in a temperature range of about −40 to −30° C.

The circular knit has a tensile strength in the longitudinal direction (L) of about 20 to 70 kgf/cm and a tensile strength in the width direction (W) of about 20 to 50 kgf/cm in a temperature range of about 20 to 30° C., and a tensile strength in the longitudinal direction (L) of about 50 to 100 kgf/cm and a tensile strength in the width direction (W) of about 10 to 60 kgf/cm in a temperature range of about −40 to −30° C.

In the related art, when a microfiber nonwoven fabric impregnated with a polyurethane resin is used as the textile substrate layer 10, it has lower elongation than that of the circular knit fabric, so when the worker performs covering with the artificial leather for crash pads, wrinkles are frequently formed due to lack of workability, disadvantageously deteriorating the quality of the product.

The artificial leather for crash pads according to exemplary embodiments of the present invention may be formed of a stretchable circular knit fabric that satisfies the range of physical properties as described above, thereby satisfying airbag deployment tests, improving workability when workers perform direct covering with the artificial leather for crash pads, and preventing winkles from forming.

The textile substrate layer 10 may have a thickness of about 0.4 to 1.0 mm (millimeters), about 0.60 to 0.80 mm (millimeters), or particularly of about 0.70 to 0.75 mm (millimeters). When the thickness of the textile substrate layer 10 is less than the numerical range, e.g., less than about 0.4 mm, the durability of the artificial leather may be reduced, and when it is greater than the numerical range, e.g., greater than about 1.0 mm, costs may increase and it may be difficult to maintain moldability.

The thickness of yarns constituting the circular knit fabric may be about 100 to 150 denier, about 110 to 150 denier, or particularly about 120 to 150 denier. When the thickness of the yarns constituting the circular knit fabric falls within the above range, the strength thereof may be excellent.

The yarns constituting the circular knit fabric may include one or more selected from the group consisting of natural fibers, synthetic fibers, and regenerated fibers.

The natural fibers may include one or more selected from the group consisting of cotton fibers, hemp fibers, wool fibers, and silk fibers.

The synthetic fibers may include one or more selected from the group consisting of polyester fibers, nylon fibers, polyolefin fibers, polyvinyl alcohol fibers, polyamide fibers, polyurethane fibers, and polyvinylidene chloride fibers.

The regenerated fibers may include rayon fibers or cupra fibers.

The polyurethane composite may include a polyurethane resin, and the polyurethane resin may suitably include one or more selected from the group consisting of polycarbonate-based polyurethane resins, polyester-based polyurethane resins, and polyether-based polyurethane resins.

The polyurethane resin may be prepared by reacting a polyol with diisocyanate and a chain extender.

The diisocyanate may include one or more selected from the group consisting of aromatic diisocyanates having a benzene ring, such as 4,4'-diphenylmethane diisocyanate (MDI), xylene diisocyanate (XDI), and 1,5-naphthalene diisocyanate, aliphatic diisocyanates such as hexamethylene diisocyanate (HDI) and propylene diisocyanate, and alicyclic diisocyanates such as 1,4-cyclohexanediisocyanate, isophorone diisocyanate (IPDI), and 4,4'-dicyclohexylmethane diisocyanate ($H_{12}$MDI). Preferably, the diisocyanate may include one or more selected from the group consisting of 4,4-diphenylmethane diisocyanate (MDI), hexamethylene diisocyanate (HDI), isophorone diisocyanate (IPDI), and dicyclohexyl methane diisocyanate ($H_{12}$MDI).

The chain extender may include any one of those generally used in the art to which the present invention pertains, and may suitably include a low-molecular-weight diol compound or a diamine compound having an even number of repeating units, which is advantageous for increasing crystallinity. The chain extender preferably includes at least one selected from the group consisting of ethylene glycol (EG), diethylene glycol (DEG), propylene glycol (PG), 1,4-butanediol (1,4-BD), 1,6-hexanediol (1,6-HD), methylpentanediol, and isophoronediamine (IPDA).

The polyurethane resin may include the chain extender in an amount of about 1 to 15 parts by weight, or particularly 2 to 10 parts by weight, based on 100 parts by weight of the polyol.

The polyurethane resin may be prepared by inducing a reaction between a soft segment containing a hydroxyl group (—OH) at both ends thereof and a hard segment containing an isocyanate group at both ends thereof.

Particularly, the polycarbonate-based polyurethane resin may be a polyurethane resin prepared using a polycarbonate diol reactant as a soft segment, the polyester-based polyurethane resin may be a polyurethane resin prepared using a polyether diol reactant as a soft segment, and the polyether-based polyurethane resin may be a polyurethane resin prepared using a polyether diol reactant as a soft segment.

The polyurethane composite resin may further contain an additive. The polyurethane resin may include the additive in an amount of 30 to 150 parts by weight, 30 to 120 parts by weight, or particularly about 30 to 90 parts by weight, based on 100 parts by weight of the polyurethane resin.

The additive may include one or more selected from the group consisting of calcium carbonate, flame retardants, surfactants, toners, and combinations thereof. In particular, the tensile strength of the circular knit may be achieved using the calcium carbonate as a filler, and the combustion reaction in the event of a vehicle fire can be inhibited using the flame retardant.

The flame retardant may be an inorganic flame retardant such as phosphorus or bromine.

The surfactant may include one or more selected from anionic surfactants and nonionic surfactants. However, the technical spirit of the present invention is not limited as to the type of surfactant, and any surfactant that can be used in the technical field to which the present invention pertains may be used.

The polyurethane composite resin may contain a solvent in an amount of about 30 to 300 parts by weight, or particularly about 30 to 200 parts by weight, based on 100 parts by weight of the polyurethane composite resin.

The solvent may suitably include one or more selected from the group consisting of dimethylformamide, methyl-ethylketone, dimethylacetamide, N-methylpyrrolidone, dimethylsulfoxide, and ethyl acetate. However, the technical spirit of the present invention is not limited as to the type of the solvent, and any solvent capable of dissolving the polyurethane resin may be used.

Although not specifically shown in the FIGURE, the artificial leather 100 for crash pads according to an exemplary embodiment of the present invention may further include a napped layer on at least one surface of the textile substrate layer 10.

The thickness of the fibers constituting the napped layer may be about 0.4 to 1.0 mm (millimeters), about 0.60 to 0.80 mm (millimeters), or particularly about 0.70 to 0.75 mm (millimeters). When the thickness of the fibers constituting the napped layer satisfies the above numerical range, the textile substrate layer can exhibit cushioning properties, and thus has an advantage of being easily attached to an injection-molded product having no cushioning properties.

The fibers constituting the napped layer may, for example, include PET fibers.

The thickness of the napped layer may be about 0.1 to 0.6 mm (millimeters), about 0.1 to 0.3 mm (millimeters), or particularly about 0.1 to 0.2 mm (millimeters).

The artificial leather 100 for crash pads according to an exemplary embodiment of the present invention may further include a non-napped layer on one or more surface of the textile substrate layer 10. The non-napped layer may include a layer having no hair and specifically may be made of a polyurethane resin impregnated with PET fibers.

The thickness of the non-napped layer may be about 0.1 to 0.6 mm (millimeters), 0.1 to 0.3 mm (millimeters), or particularly about 0.1 to 0.2 mm (millimeters).

2. Wet Foaming Layer 20

The wet foaming layer 20 may be disposed on the textile substrate layer 10. The wet foaming layer 20 may be disposed directly on the textile substrate layer 10. It will be understood that when an element is referred to as being "directly on" another element, there are no intervening elements present between the two elements.

The wet foaming layer 20 may maintain an aesthetically pleasing appearance over time because the highly stretchable circular knit compensates for damage to the appearance caused by marks left on artificial leather.

Particularly, the wet foaming layer 20 may suitably include a polyurethane resin, and may, optionally, be a mixture thereof with at least one selected from the group consisting of a polyvinylidene chloride (PVDC) resin, a polyvinylidene fluoride (PVDF) resin, a chlorinated polyvinyl chloride (CPVC) resin, a polyvinyl alcohol (PVA) resin, a polyvinyl acetate (PVAc) resin, a polyvinyl butyrate (PVB) resin, a polyethylene (PE) resin, and a polypropylene (PP) resin.

The thickness of the wet foaming layer 20 may be about 0.1 to 0.5 mm (millimeters), about 0.1 to 0.3 mm (millimeters), or particularly about 0.15 to 0.25 mm (millimeters). When the thickness of the wet foaming layer 20 does not fall within the above numerical range, the wet foaming layer 20 cannot cover the fabric marks left on the artificial leather, which may mar aesthetics.

3. Upper Layer 30

The upper layer 30 may include a binder layer 40, a skin layer 50, and a surface treatment layer 60.

(1) Binder Layer 40

The binder layer 40 may be disposed on the wet foaming layer 20. Particularly, the binder layer 40 may be disposed directly on the wet foaming layer 20. Accordingly, the wet foaming layer 20 may be disposed between the binder layer 40 and the textile substrate layer 10.

The thickness of the binder layer 40 may be about 0.05 to 0.3 mm (millimeters), about 0.07 to 0.15 mm (millimeters), or particularly about 0.07 to 0.08 mm (millimeters). When the thickness of the binder layer satisfies the above numerical range, adhesion between the wet foaming layer and the skin layer may be excellent, and a cooling feel may be imparted to the surface of the artificial leather.

The binder layer 40 includes a binder resin to provide excellent adhesion between the wet foaming layer 20 and the skin layer 50, and includes hollow microparticles as necessary to lower the thermal conductivity of artificial leather to thereby improve the cooling feeling of the surface of the artificial leather.

The binder layer 40 may be formed using a binder composition that preferably contains a binder resin, hollow microparticles, and a crosslinking agent, or further contains an aqueous solvent or an organic solvent as a dispersion medium, if necessary.

The binder resin may, for example, include one or more selected from the group consisting of a polyurethane resin, a polyamide resin, an ethylene vinyl acetate resin, an ethylene ethyl acetate resin, a styrene-based thermoplastic elastomer, a polyester resin, an ethylene-acrylic copolymer, and a polyolefin resin, and is preferably a polyurethane resin.

The polyurethane resin used in the binder layer 40 may, for example, include at least one selected from the group consisting of polyester-based polyurethane, polyether-based polyurethane, polycarbonate-based polyurethane, polyacetal-based polyurethane, polyacrylate-based polyurethane, polyester-based amide polyurethane, polythioether-based polyurethane, and polyolefin-based polyurethane, preferably polyether-based polyurethane or polycarbonate-based polyurethane, which provides excellent hydrolysis resistance and heat resistance.

The hollow microparticles may include a vacuum layer or an air layer therein, and may have an effect of imparting a better cooling feel to the surface of the artificial leather by reducing the thermal conductivity of the artificial leather to thereby block the transfer of heat from the automobile parts.

The shape of the hollow microparticles is not particularly limited, and may, for example, include at least one selected from the group consisting of a plate shape (including a scale shape), a spherical shape, a needle shape, a rod shape, and a fiber shape. The hollow microparticles may preferably have a spherical shape.

When the hollow microparticles have a spherical shape, they may reduce thermal conduction due to the minimized surface area and the small contact area between the particles, and the smooth spherical surface minimizes radiative reflection so as to effectively block heat transfer and realize an excellent thermal insulation effect.

The hollow microparticles may be present in an amount of about 20 to 60 parts by weight, about 30 to 50 parts by weight, or particularly about 30 to 40 parts by weight based on 100 parts by weight of the binder resin. When the content of the hollow microparticles is less than the above numerical range, the cooling feel of the artificial leather may be insufficient, and when the content is higher than the above numerical range, workability may be lowered, and the adhesive force of the binder layer may be lowered.

The hollow microparticles may, for example, be a flame retardant, ceramic powder, or glass bubble, but are not limited thereto, and may be any kind of microparticle having a single hollow or a plurality of hollows formed therein.

The ceramic powder may be a powder including aluminum silicate and having a melting point of about 1,770 to 2,300° C., and a compressive strength of a film formed therefrom of about 2,800 to 3,500 N/cm², thereby exhibiting improved durability.

The ceramic powder may preferably have an apparent density of about 0.5 to 1.0 g/cm³, or particularly about 0.7 to 0.9 g/cm³. The ceramic powder has an effect of exhibiting excellent productivity and heat insulation within the above numerical range.

The glass bubble may, for example, include soda-lime-borosilicate glass in an amount of at least about 90% by weight of, at least about 94% by weight thereof, or particularly at least about 97% by weight thereof.

(2) Skin Layer 50

The skin layer 50 according to the present invention may realize a texture similar to natural leather, and may include a polyurethane resin. The polyurethane resin may, for example, include one or more selected from the group consisting of a polyester-based polyurethane resin, a poly-acrylate-based polyurethane resin, a polyester-based amide polyurethane resin, a polythioether-based polyurethane resin, and a polyolefin-based polyurethane resin, and may have advantages of excellent hydrolysis resistance and heat resistance.

The thickness of the skin layer 50 may be about 0.05 to 0.3 mm (millimeters), about 0.05 to 0.15 mm (millimeters), or particularly about 0.05 to 0.10 mm (millimeters). When the thickness of the skin layer satisfies the above numerical range, the color of the skin layer may be clear.

The skin layer 50 may be formed using a skin layer composition further containing about 30 to 60 parts by weight of a solvent based on 100 parts by weight of the polyurethane resin. When the content of the solvent satisfies the above numerical range, workability may be improved by maintaining an appropriate viscosity during the skin layer application operation.

The solvent may, for example, include one or more selected from the group consisting of dimethylformamide, methylethylketone, dimethylacetamide, N-methylpyrroli-done, dimethylsulfoxide, and ethyl acetate. However, the technical spirit of the present invention is not limited as to the type of solvent, and any solvent capable of dissolving the polyurethane resin may be used.

The skin layer 50 may further contain a pigment in an amount of about 10 to 50 parts by weight, about 15 to 40 parts by weight, or particularly about 20 to 30 parts by weight based on 100 parts by weight of the polyurethane resin.

The pigment may include one or more selected from the group consisting of a black pigment, a brown pigment, a white pigment, and a beige pigment. However, the technical spirit of the present invention is not limited thereto, and any pigment may be used, as long as it is generally used in the technical field of the present invention.

For example, the pigment may be an organic pigment, preferably a liquid organic pigment, and thus may have excellent dispersibility and excellent colorability in the skin layer composition.

The organic pigment may, for example, include selected from the group consisting of azo-based, anthraquinone-based, phthalocyanine-based, perinone-based, perylene-based, indigo-based, thioindigo-based, dioxadine-based, quinacridone-based, isoindolinone-based, isoindoline-based, diketopyrrolopyrrole-based, azomethine-based, and azo-azomethine-based pigments.

The skin layer 50 may optionally include any one selected from the group consisting of UV inhibitors, light stabilizers, antioxidants, flame retardants, slip agents, antistatic agents, dispersants, surfactants, and mixtures thereof, and the content and type thereof are not greatly limited, and do not affect the present invention.

(3) Surface Treatment Layer 60

The surface treatment layer 60 may be disposed on the skin layer 50. Particularly, the surface treatment layer 60 may be disposed directly on the skin layer 50. Accordingly, the skin layer 50 may be disposed between the binder layer 40 and the surface treatment layer 60.

The thickness of the surface treatment layer 60 may be about 0.001 to 0.01 mm (millimeters), about 0.001 to 0.008 mm (millimeters), or particularly about 0.001 to 0.005 mm (millimeters). When the thickness of the surface treatment layer 60 is within the above numerical range, the surface treatment layer 60 may exhibit excellent abrasion resistance, light resistance, hydrolysis resistance and chemical resistance without greatly increasing costs.

The surface treatment layer 60 may improve functions such as light resistance, hydrolysis resistance, and chemical resistance of the artificial leather. Particularly, the surface treatment layer 60 may be formed by coating the skin layer 50 with a surface treatment agent. The surface treatment agent may be classified into an aqueous surface treatment agent or an oily surface treatment agent according to the nature (aqueous or oily) of the solvent serving as a dispersion medium.

The surface treatment layer 60 may be preferably formed using a polyurethane base resin containing a crosslinking agent and a silicone compound, particularly using a poly-urethane base resin containing a crosslinking agent, a reactive silicone compound, a polyolefin wax, and polyurethane beads. In this case, the surface treatment layer 60 may have excellent sound absorption capability and a luxurious appearance.

The crosslinking agent may be included in an amount of about 3 to 7 parts by weight, about 4 to 6 parts by weight, or particularly about 4 to 5 parts by weight, based on 100 parts by weight of the polyurethane base resin. Within this range, the crosslinking agent has sound absorbing capability and a luxurious appearance.

Any crosslinking agent is not particularly limited, and the crosslinking agent may suitably include compounds containing at least one selected from the group consisting of an aziridine group, an isocyanate group, and a carbodiimide group in the molecule. The crosslinking agent has advantages of better sound absorbing capability and a luxurious appearance.

The content of the silicone compound may be about 5 to 20 parts by weight, 5 to 15 parts by weight, or particularly about 8 to 10 parts by weight, based on 100 parts by weight of the polyurethane base resin. Within this range, there is an advantage of an excellent surface texture.

The silicone compound may suitably include polysiloxane, liquid polysiloxane at room temperature, polysiloxane in the form of beads, or a mixture thereof, or particularly liquid polysiloxane at room temperature. Within this range, there is an advantage of an excellent surface texture.

Method of Manufacturing Artificial Leather

A method of manufacturing artificial leather for crash pads includes forming a textile substrate layer 10, forming a wet foaming layer 20 on the textile substrate layer 10, and forming an upper layer 30 on the wet foaming layer 20.

The method of manufacturing the artificial leather for crash pads includes forming a wet foaming layer 20 on the textile substrate layer 10 or the upper layer 30 and laminating the formed wet foaming layer 20 to the textile substrate layer 10 or the upper layer 30.

The forming the textile substrate layer 10 may include impregnating the circular knit fabric with an impregnation solution and forming a coating layer using a coating solution.

For example, forming the textile substrate layer 10 may include impregnating the circular knit fabric with an impregnation solution (e.g., a polyurethane solution), coating the impregnated circular knit fabric with a coating solution, coagulating the circular knit fabric in an aqueous dimethylformamide solution, and washing the coagulated circular knit fabric with water to remove the solvent (e.g., DMF) therefrom. Through the above steps, the artificial leather can be imparted with tactile sensation such as softness and fullness, and shape retention to withstand repeated stretching, and can maintain elongation suitable for the covering process.

The method of manufacturing artificial leather for crash pads may further include forming a nap on at least one surface of the textile substrate layer 10. Preferably, the method may further include forming a nap on the surface of the textile substrate layer 10 that is attached to the injection-molded product and thus can provide excellent adhesion of the artificial leather to the injection-molded product and the tactile sensation of the artificial leather.

EXAMPLE

Hereinafter, the present invention will be described in more detail with reference to specific examples. However, the following examples are provided only for better understanding of the present invention, and thus should not be construed as limiting the scope of the present invention.

Preparation Example 1: Production of Microfiber Nonwoven Fabric and Circular Knits The fabrics constituting the textile substrate layer according to the following Comparative Preparation Examples 1 to 3 and Preparation Examples 1 to 4 were produced. The following circular knits were produced using a circular knitting machine (measuring equipment: manufacturer Ssangyong Machinery).

Comparative Preparation Example 1

A web was formed with short island-in-the-sea fibers at a weight ratio of nylon to polyester of 70:30, was impregnated with a polyurethane solution, coagulated, washed and dried, and then the result was added to liquid caustic soda to reduce the amount of polyester in the island-in-the-sea fiber. The result was washed and dried to prepare, as a nonwoven fabric, a textile substrate layer having a thickness of 0.95 mm and a basis weight of 400 to 500 $g/m^2$.

Comparative Preparation Example 2

A circular knit fabric was formed by weaving yarns made of polyester having a thickness of 90 denier.

Comparative Preparation Example 3

A circular knit fabric was formed by weaving yarns made of polyester having a thickness of 160 denier.

Preparation Example 1

A circular knit fabric was formed by weaving yarns made of polyester having a thickness of 100 denier.

Preparation Example 2

A circular knit fabric was formed by weaving yarns made of polyester having a thickness of 120 denier.

Preparation Example 3

A circular knit fabric was formed by weaving yarns made of polyester having a thickness of 130 denier.

Preparation Example 4

A circular knit fabric was formed by weaving yarns made of polyester having a thickness of 150 denier.

Experimental Example 1: Comparison of Physical Properties

The physical properties of the circular knits produced in Comparative Preparation Examples 1 to 3 and Preparation Examples 1 to 4 were measured. Details of the measurement method are as follows.

The elongation and tensile strength of the circular knits produced in Comparative Preparation Examples 1 to 3 and Preparation Examples 1 to 4 were measured using a tensile tester (Instron, Shimadzu Corporation), the specimens were taken in a width (W) direction and in a longitudinal (L) direction in accordance with MS 300-31, a gauge mark of 100 mm was drawn on each sample, and the sample was installed in a tester and extended at 200 mm/min, and the maximum weight was obtained when the specimen broke.

$$L=(L_1-L_0)/L_0 \times 100 \qquad \text{[Equation 1]}$$

wherein L represents an elongation (%), $L_0$ represents a distance between gauge points before the test, and $L_1$ represents the distance between gauge points when the skin or bubble breaks after the test.

TABLE 1

| 25° C. | | Comparative Preparation Example 1 | Comparative Preparation Example 2 | Comparative Preparation Example 3 | Preparation Example 1 | Preparation Example 2 | Preparation Example 3 | Preparation Example 4 |
|---|---|---|---|---|---|---|---|---|
| Elongation (%) | Length direction (L) | 65 | 105 | 70 | 95 | 80 | 75 | 70 |
| | Width direction (W) | 115 | 180 | 105 | 160 | 140 | 130 | 110 |
| Tensile strength (kfg/cm) | Length direction (L) | 50 | 30 | 70 | 35 | 50 | 55 | 65 |
| | Width direction (W) | 30 | 20 | 55 | 30 | 35 | 40 | 45 |

Production Example 1: Production of Artificial Leather for Crash Pads

Artificial leathers for crash pads according to Comparative Examples and Examples were produced using Comparative Preparation Examples and Preparation Examples. A wet foaming layer and an upper layer were formed on the textile substrate layer using a method well known to those skilled in the art to which the present invention pertains. The wet foaming layer and the upper layer were set to be the same.

Comparative Example 1

A textile substrate layer was formed using the microfiber nonwoven fabric according to Comparative Preparation Example 1. The microfiber nonwoven fabric was impregnated with an impregnation solution containing a polyurethane resin to produce an artificial leather including a textile substrate layer.

Comparative Example 2

An artificial leather was produced in the same manner as in Comparative Example 1, except that a textile substrate layer was formed using the circular knit fabric according to Comparative Preparation Example 2.

Comparative Example 3

An artificial leather was produced in the same manner as in Comparative Example 1, except that a textile substrate layer was formed using the circular knit fabric according to Comparative Preparation Example 3.

Example 1

An artificial leather was produced in the same manner as in Comparative Example 1, except that a textile substrate layer was formed using the circular knit fabric according to Preparation Example 1, instead of Comparative Preparation Example 1.

Example 2

An artificial leather was produced in the same manner as in Comparative Example 1, except that a textile substrate layer was formed using the circular knit fabric according to Preparation Example 2, instead of Comparative Preparation Example 1.

Example 3

An artificial leather was produced in the same manner as in Comparative Example 1, except that a textile substrate layer was formed using the circular knit fabric according to Preparation Example 3, instead of Comparative Preparation Example 1.

Example 4

An artificial leather was produced in the same manner as in Comparative Example 1, except that a textile substrate layer was formed using the circular knit fabric according to Preparation Example 4, instead of Comparative Preparation Example 1.

Example 5

A textile substrate layer was formed in the same manner as in Example 1, but a buffing process was further performed to produce an artificial leather including a napped layer on one surface of the textile substrate layer. Specifically, the napped layer may have a thickness of 0.1 mm (millimeters).

Experimental Example 2: Wrinkling, Sensory Evaluation, and Whether or not Artificial Leather Passes Airbag Deployment Test The artificial leathers according to Comparative Examples 1 to 3 and Examples 1 to 5 were tested for wrinkle occurrence, sensory quality, and ability to pass an airbag deployment test.
1) Whether or not Wrinkles Occur
    After the vehicle crash pad was covered with the artificial leather, the presence/absence of wrinkles was visually observed. Specifically, when wrinkles occurred throughout, "X" was recorded, when wrinkles occurred in portions, "A" was recorded, and when wrinkles did not occur, "o" was recorded.
2) Sensory (Softness) Evaluation
    After the vehicle crash pad was covered with the artificial leather, experts in the artificial leather industry directly touched and then evaluated the softness of texture and fullness. For the degree of tactile sensation (softness), volume, texture the like were evaluated using the test method based on EN ISO 17235. When the tactile sensation, such as volume and surface texture, was excellent, it was marked as "O", and when the same was poor, it was marked as "X".
3) Whether the Airbag Deployment Test is Satisfied A passenger air bag (PAB) is installed at the innermost side of the crash pad to protect occupants. In an emergency, the PAB is deployed to protect the occupants, but if deployment is delayed or surrounding parts are damaged or scattered during deployment, the occupants may be injured. Therefore, deployment delay and scattering were evaluated through an airbag deployment test.

TABLE 2

| | Comparative Example 1 | Comparative Example2 | Comparative Example3 | Example 1 | Example 2 | Example3 | Example 4 | Example 5 |
|---|---|---|---|---|---|---|---|---|
| Whether or not wrinkles occur | ◯ | ◯ | ◯ | X | X | X | X | X |
| Sensory evaluation | ◯ | ◯ | ◯ | ◯ | ◯ | ◯ | ◯ | ◯ |
| Whether airbag deployment test is satisfied (◯/X) | X | X | X | ◯ | ◯ | ◯ | ◯ | ◯ |

According to various exemplary embodiments of the present invention, an operator can easily cover the crash pad with the artificial leather, thereby improving workability and reducing manufacturing costs. In addition, the artificial leather for crash pads can satisfy airbag deployment requirements and at the same time have an improved appearance and excellent tactile sensation.

The effects of the present invention are not limited to those mentioned above. It should be understood that the effects of the present invention include all effects that can be inferred from the description of the present invention.

The present invention has been described in detail with reference to embodiments thereof. However, it will be appreciated by those skilled in the art that changes may be made in these examples without departing from the principles and spirit of the present invention, the scope of which is defined in the appended claims and their equivalents.

What is claimed is:

1. An artificial leather for crash pads consisting essentially of:
   a textile substrate layer;
   a wet foaming layer disposed on the textile substrate layer; and
   an upper layer disposed on the wet foaming layer,
   wherein the textile substrate layer comprises a circular knit fabric and a polyurethane composite resin,
   wherein the circular knit fabric has an elongation in a longitudinal direction (L) of about 30 to 80% and an elongation in a width direction (W) of about 50 to 140% at a temperature of about 20 to 30° C., and
   wherein the circular knit has a tensile strength in the longitudinal direction (L) of about 20 to 70 kgf/cm and a tensile strength in the width direction (W) of about 20 to 50 kgf/cm at a temperature of about 20 to 30° C.

2. The artificial leather according to claim 1, wherein the circular knit fabric is impregnated with the polyurethane composite resin.

3. The artificial leather according to claim 1, wherein the circular knit comprises yarns having a thickness of about 100 to 150 denier.

4. The artificial leather according to claim 1, wherein the circular knit comprises yarns comprising one or more selected from the group consisting of natural fibers, synthetic fibers, and regenerated fibers.

5. The artificial leather according to claim 1, wherein the polyurethane composite resin comprises a polyurethane resin,
   wherein the polyurethane resin comprises one or more selected from the group consisting of polycarbonate-based polyurethane resins, polyester-based polyurethane resins, and polyether-based polyurethane resins.

6. The artificial leather according to claim 5, wherein the polyurethane composite resin further comprises an additive, and the polyurethane composite resin comprises the additive in an amount of about 30 to 150 parts by weight, based on 100 parts by weight of the polyurethane resin.

7. The artificial leather according to claim 6, wherein the additive comprises one or more selected from the group consisting of calcium carbonate, flame retardants, surfactants, and toners.

8. An artificial leather for crash pads consisting essentially of:
   a textile substrate layer;
   a wet foaming layer disposed on the textile substrate layer;
   an upper layer disposed on the wet foaming layer; and
   a napped layer on at least one surface of the textile substrate layer,
   wherein the textile substrate layer comprises a circular knit fabric and a polyurethane composite resin,
   wherein the circular knit fabric has an elongation in a longitudinal direction (L) of about 30 to 80% and an elongation in a width direction (W) of about 50 to 140% at a temperature of about 20 to 30° C., and
   wherein the circular knit has a tensile strength in the longitudinal direction (L) of about 20 to 70 kgf/cm and a tensile strength in the width direction (W) of about 20 to 50 kgf/cm at a temperature of about 20 to 30° C.

9. The artificial leather according to claim 8, wherein the napped layer comprises fibers having a thickness of about 0.6 to 0.8 mm.

10. An artificial leather for crash pads consisting essentially of:
   a textile substrate layer;
   a wet foaming layer disposed on the textile substrate layer;
   an upper layer disposed on the wet foaming layer; and a non-napped layer on at least one surface of the textile substrate layer,
   wherein the textile substrate layer comprises a circular knit fabric and a polyurethane composite resin,
   wherein the circular knit fabric has an elongation in a longitudinal direction (L) of about 30 to 80% and an elongation in a width direction (W) of about 50 to 140% at a temperature of about 20 to 30° C., and
wherein the circular knit has a tensile strength in the longitudinal direction (L) of about 20 to 70 kgf/cm and a tensile strength in the width direction (W) of about 20 to 50 kgf/cm at a temperature of about 20 to 30° C.

11. The artificial leather according to claim 10, wherein the non-napped layer comprises a polyurethane resin impregnated with ester fibers.

12. The artificial leather according to claim 1, wherein the upper layer comprises:

a binder layer;

a skin layer disposed on the binder layer; and a surface treatment layer disposed on the skin layer.

13. A crash pad comprising the artificial leather for crash pads according to claim 1.

14. A vehicle comprising a crash pad of claim 13.

\* \* \* \* \*